(12) United States Patent
Wu

(10) Patent No.: US 11,292,357 B2
(45) Date of Patent: Apr. 5, 2022

(54) INTELLIGENT CURRENT CONTROL APPARATUS

(71) Applicant: DELTA ELECTRONICS, INC., Taoyuan (TW)

(72) Inventor: Tsung-Yuan Wu, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 287 days.

(21) Appl. No.: 16/502,634

(22) Filed: Jul. 3, 2019

(65) Prior Publication Data
US 2020/0290470 A1   Sep. 17, 2020

(30) Foreign Application Priority Data
Mar. 13, 2019 (CN) .......................... 201910187394.9

(51) Int. Cl.
| | |
|---|---|
| *B60L 53/62* | (2019.01) |
| *G05F 3/04* | (2006.01) |
| *H02J 3/10* | (2006.01) |
| *H02J 3/14* | (2006.01) |
| *H02M 5/14* | (2006.01) |
| *H02M 5/27* | (2006.01) |

(52) U.S. Cl.
CPC ............. *B60L 53/62* (2019.02); *G05F 3/04* (2013.01); *H02J 3/10* (2013.01); *H02J 3/14* (2013.01); *H02M 5/14* (2013.01); *H02M 5/271* (2013.01); *B60L 2210/22* (2013.01)

(58) Field of Classification Search
USPC .................................. 307/10.1, 9.1; 320/109
See application file for complete search history.

(56) References Cited

U.S. PATENT DOCUMENTS

| | | | |
|---|---|---|---|
| 2016/0294300 A1* | 10/2016 | Sakakibara | ............. H02M 7/48 |
| 2018/0162228 A1* | 6/2018 | Gotz | ........................ H02J 5/00 |
| 2018/0264966 A1* | 9/2018 | Kubota | ................. H02J 7/0027 |
| 2018/0339595 A1* | 11/2018 | Chang | ................. B60L 11/1811 |
| 2020/0070678 A1* | 3/2020 | Krammer | ................ B60L 53/66 |

FOREIGN PATENT DOCUMENTS

| | | |
|---|---|---|
| CN | 105811553 B | 5/2018 |
| CN | 108574281 A | 9/2018 |

* cited by examiner

*Primary Examiner* — Toan T Vu
*Assistant Examiner* — Xuan Ly
(74) *Attorney, Agent, or Firm* — Muncy, Geissler, Olds & Lowe, P.C.

(57) ABSTRACT

An intelligent current control apparatus provides a current control for a power supply branch and a load. The intelligent current control apparatus includes at least one power conversion unit and a control unit. The control unit controls a total phase current, which is composed of a single-phase current and a household phase current in the same phase, to be less than or equal to a rated phase current of the power supply branch.

15 Claims, 8 Drawing Sheets

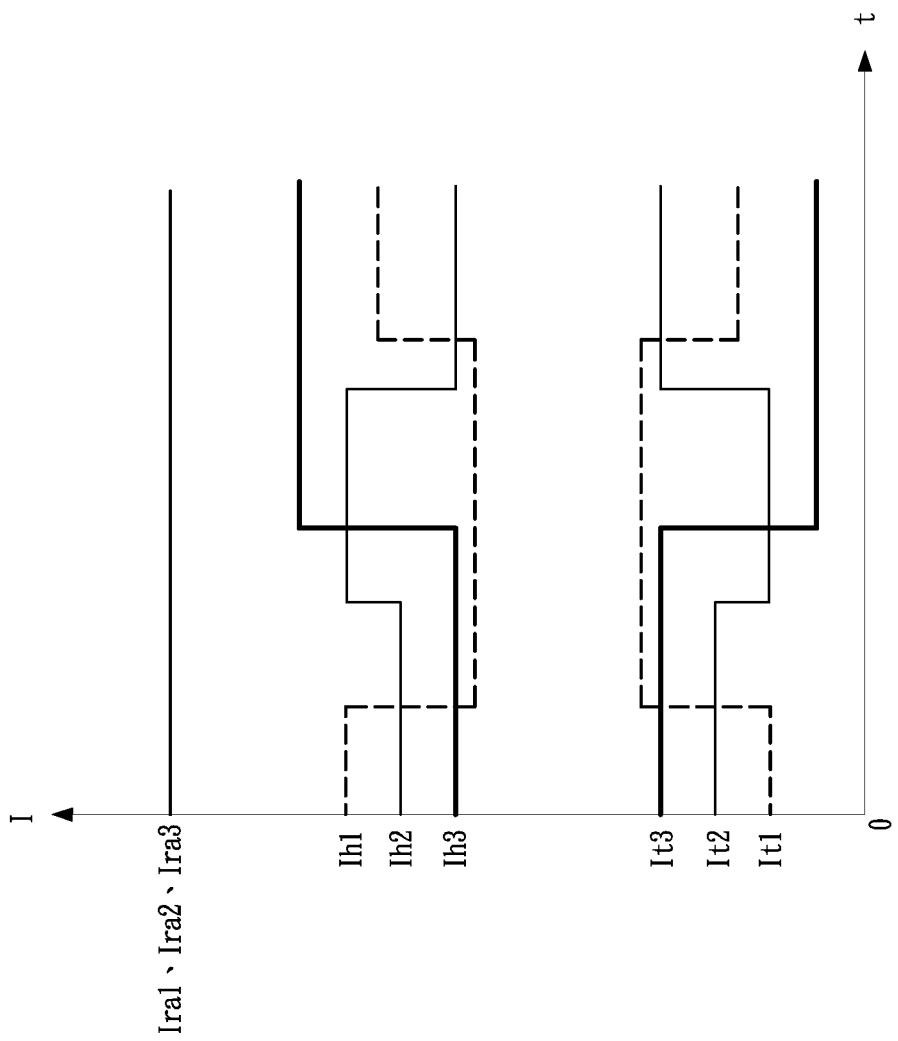

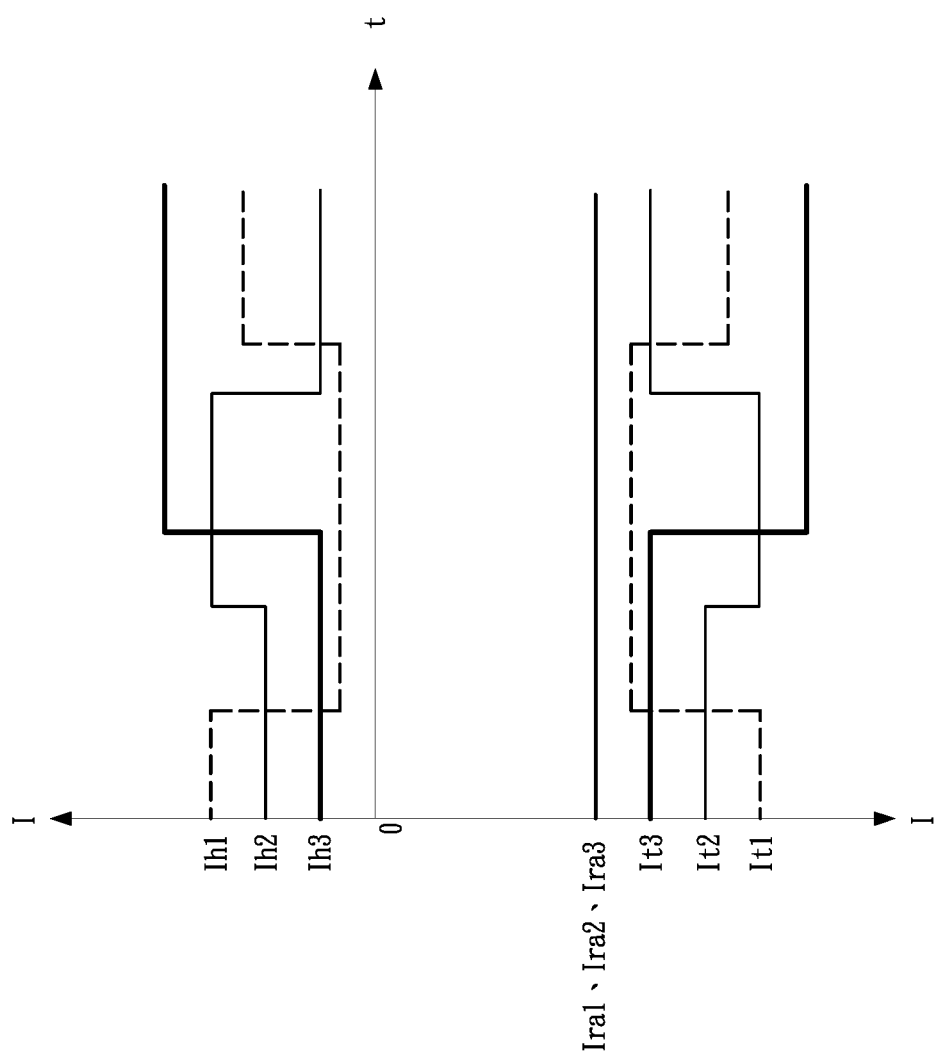

INTELLIGENT CURRENT CONTROL APPARATUS

BACKGROUND

Technical Field

The present disclosure relates to an intelligent current control apparatus, and more particularly to an intelligent current control apparatus for bi-directionally and dynamically adjusting charging and discharging current of an electric vehicle.

Description of Related Art

The statements in this section merely provide background information related to the present disclosure and do not necessarily constitute prior art.

In the applications of charging and discharging of the electric vehicle, the current practice is to provide an independent charging branch to meet the rated power for the charger of the electric vehicle since the electric power required by the electric vehicle is large, and therefore additional power capacity for the charger of the electric vehicle needs to be applied. However, in some applications such as personal residences, it is difficult to effectively use the electricity power, reduce time for charging the electric vehicle, and improve the convenience for the users under a limited power supply. Under the existing power supply branch with the distributed rated power, the supply power would be limited by the available power which is equal to the rated power of each supply branch minus the power consumed by the loads in order to avoid that the total used power exceeds the rated power to cause the front-end circuit breaker tripping. In addition, when the electric vehicle is connected to the charger, the battery inside the electric vehicle could be an electricity source to provide the power system for power dispatching.

SUMMARY

In order to solve the above-mentioned problems, an intelligent current control apparatus is provided. The intelligent current control apparatus provides a current control for a power supply branch and a load. The intelligent current control apparatus includes at least one power conversion unit and a control unit. The power conversion unit delivers a total charging-discharging power to charge or discharge the load according to a plurality of independent single-phase currents. The control unit is coupled to the at least one power conversion unit. The control unit controls a total phase current, which is composed of the single-phase current and a household phase current in the same phase, to be less than or equal to a rated phase current of the power supply branch.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows:

FIG. 5A is a schematic waveform of a charging control of the intelligent current control apparatus according to the present disclosure, and FIG. 5B is a schematic waveform of a discharging control of the intelligent current control apparatus according to the present disclosure.

DETAILED DESCRIPTION

Figure 1:
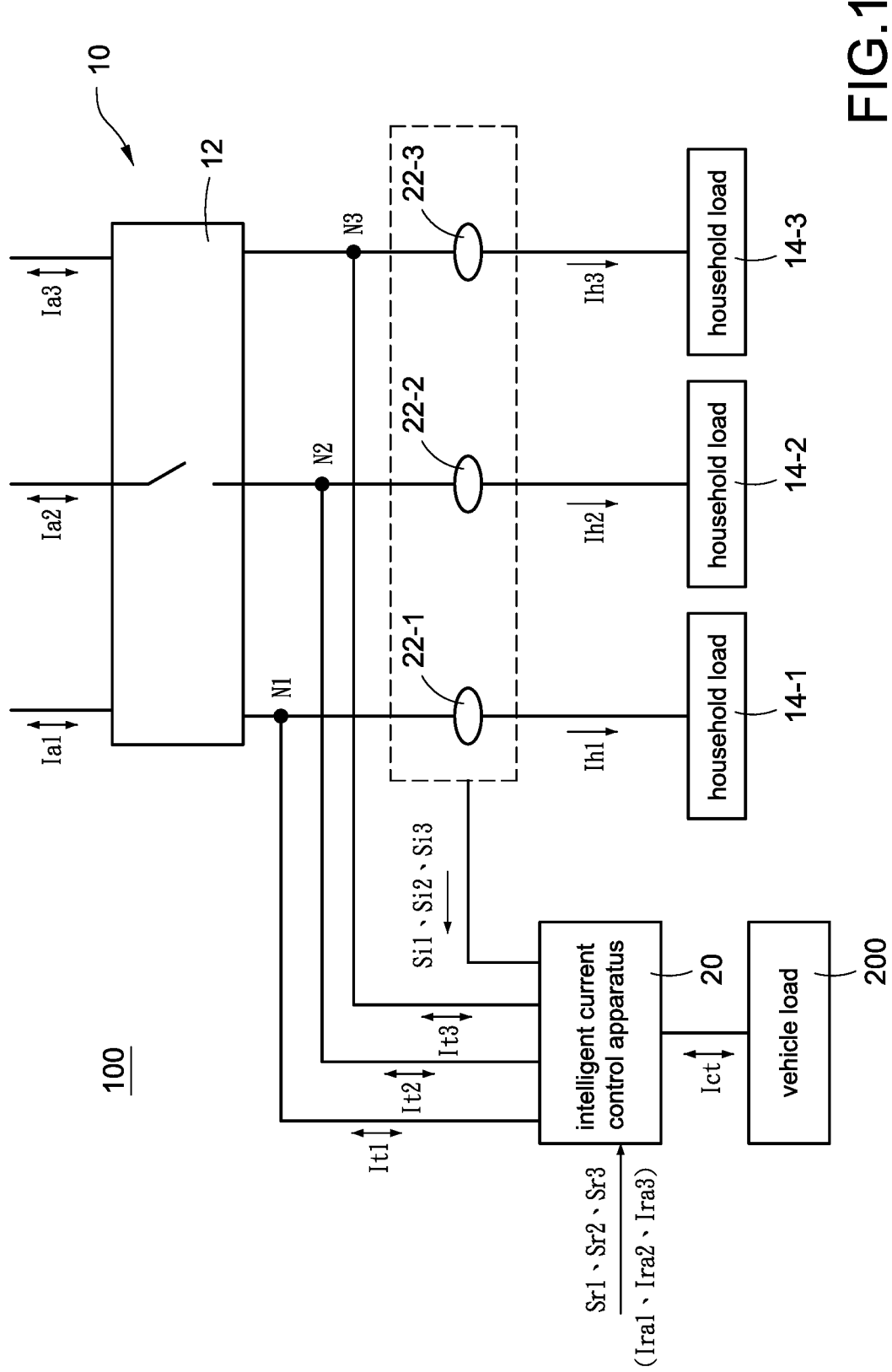
FIG. 1 is a circuit block diagram of an intelligent current control apparatus of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a circuit block diagram of an intelligent current control apparatus of the present disclosure. A power supply system 100 is coupled to a vehicle load 200, and the power supply system 100 includes a power supply branch 10 and an intelligent current control apparatus 20. In particular, the vehicle load 200 may be, for example but not limited to, an electric vehicle (EV). The electric vehicle mentioned here may be other large power loads that would affect the original power supply configuration. The power supply branch 10 includes a breaker unit 12 and a plurality of household loads 14-1~14-3, and a plurality of independent total phase currents Ia1~Ia3 are transmitted (received and provided) by a power company through the power supply branch 10. The intelligent current control apparatus 20 is coupled to the breaker unit 12, the household loads 14-1~14-3, and the vehicle load 200. In particular, the breaker unit 12 may be a protective device, such as but not limited to a breaker or a fuse. The plurality of actual total phase currents Ia1~Ia3 correspond to the household phase currents Ih1~Ih3 provided from the household loads 14-1~14-3, and correspond to a plurality of single-phase currents It1~It3 transmitted from the intelligent current control apparatus 20. After the plurality of single-phase currents It1~It3 are controlled and converted by the intelligent current control apparatus 20, the intelligent current control apparatus 20 provides a total charging-discharging current Ict to charge the vehicle load 200, or the vehicle load 200 discharges to the intelligent current control apparatus 20 through the total charging-discharging current Ict, and therefore a bi-directional current control of the vehicle load 200 can be implemented.

Specifically, a rated power for the power supply branch 10 can be agreed by the power company and each user client, or be set by the user client based on the rated power distributed by the power company. According to the set or agreed rated power, the intelligent current control apparatus 20 can acquire rated current signals Sr1~Sr3 of each branch, wherein the rated current signals Sr1~Sr3 involve information of rated phase currents Ira1~Ira3. Each user client uses the rated power by dividing it into multiple independent branches according to actual needs. For example, electricity in a living room is one branch, electricity in a kitchen is another branch, and electricity in a room is further another branch. Since the load coupled to each branch is not the same, the power consumption of each individual branch is usually different.

The intelligent current control apparatus 20 charging the vehicle load 200 is exemplified for further demonstration. Since the household load 14-1~14-3 of each phase may be difference, (for example but not limited to, that the household load 14-1 is an appliance in the living room, such as a television, the household load 14-2 is an appliance in the kitchen, such as a refrigerator, the household load 14-3 is an appliance in the room, such as an electric light), the consumed household phase currents Ih1~Ih3 may be different, such as 5 amperes, 10 amperes, and 1 ampere consumed by the television, the refrigerator, and the electric light, respectively. Therefore, the available (remaining) single-phase currents It1~It3 (by subtracting the household phase currents Ih1~Ih3 from the rated phase currents Ira1~Ira3) may be different.

The available (remaining) single-phase currents It1~It3 provide for the vehicle load 200 and usually in the same current for each phase thereof. Moreover, in order to avoid the used power of any phase exceeds the rated power, the minimum current of available single-phase currents It1~It3 is used as a current reference of charging the vehicle load 200. Therefore, when at least one of the available maximum value of the single-phase currents It1~It3 is different, the charging current in the conventional operation would be limited, that is because the sum of the available single-phase currents It1~It3 is greater than a current which is equal to the phase current that is the minimum available current multiply by the phase number. Accordingly, the main purpose of the present disclosure is to independently limit, adjust, and control the single-phase currents It1~It3 by the intelligent current control apparatus 20 so that multi-phase supplying powers can used most effectively according to rated powers and actual used powers of each phase. In comparison with the conventional operations, it is to achieve that the rated power of the original setting can be maximized and the charging and discharging time of the vehicle load 200 can be shortened, thereby improving the charging and discharging performance of the intelligent current control apparatus 20.

Please refer to FIG. 1 again, the intelligent current control apparatus 20 includes a plurality of first current detection units 22-1~22-3, and the first current detection units 22-1~22-3 are coupled to paths between coupling points of the intelligent current control apparatus 20 and the household loads 14-1~14-3, respectively. The consumed household phase currents Ih1~Ih3 of the household loads 14-1~14-3 can be realized according to household current signals Si1~Si3, and the rated phase currents Ira1~Ira3 can be realized according to the rated current signals Sr1~Sr3. According to the household current signals Si1~Si3 and the rated current signals Sr1~Sr3, the intelligent current control apparatus 20 provides the single-phase currents It1~It3 to the vehicle load 200 for the current control so that an available maximum current for the vehicle load 200 is determined according to a synthesis current based on the rated phase currents Ira1~Ira3 and the household phase currents Ih1~Ih3. As shown in FIG. 1, each of the rated phase currents Ira1~Ira3, each of the corresponding household phase currents Ih1~Ih3, and each of the corresponding single-phase currents It1~It3 of charging the vehicle load 200 are collected at nodes N1~N3. It is assumed that the current flowing out the node N1~N3 is positive and the current flowing in the node N1~N3 is negative. When the vehicle load 200 is in a charging mode, that is the vehicle load 200 is charged by the intelligent current control apparatus 20, each of the total phase currents Ia1~Ia3, which is equal to each of the corresponding household phase currents Ih1~Ih3 plus each of the corresponding single-phase currents It1~It3, must be less than or equal to each of the corresponding rated phase currents Ira1~Ira3. Take a first branch as an example, and the current direction is considered: It1+Ih1+(−Ia1)=0. The formula is adjusted as: Ih1+It1=Ia1<Ira1.

When the vehicle load 200 is in a discharging mode, the household loads 14-1~14-3 can be supplied by the electricity provided from the vehicle load 200. Besides, the surplus electricity can wholesale to the power company. At this condition, each of the total phase currents Ia1~Ia3, which is equal to each of the corresponding single-phase currents It1~It3 minus the household phase currents Ih1~Ih3, must be less than or equal to each of the corresponding rated phase currents Ira1~Ira3. Take the first branch as an example, and the current direction is considered: (−It1)+Ih1+Ia1=0. The formula is adjusted as: It1−Ih1=Ia1<Ira1. In one embodiment of the present disclosure, the rated power or the rated current means that the maximum power or the maximum current that each user client can use. Also, the rated power or the rated current is not limited to be directly related to protection points of the breaker unit 12, that is, the rated power or the rated current can be further set and controlled according to the contract by the power company through a communication manner to achieve the power of power dispatching, or can be further set according to the contract by the user client.

Figure 2A:
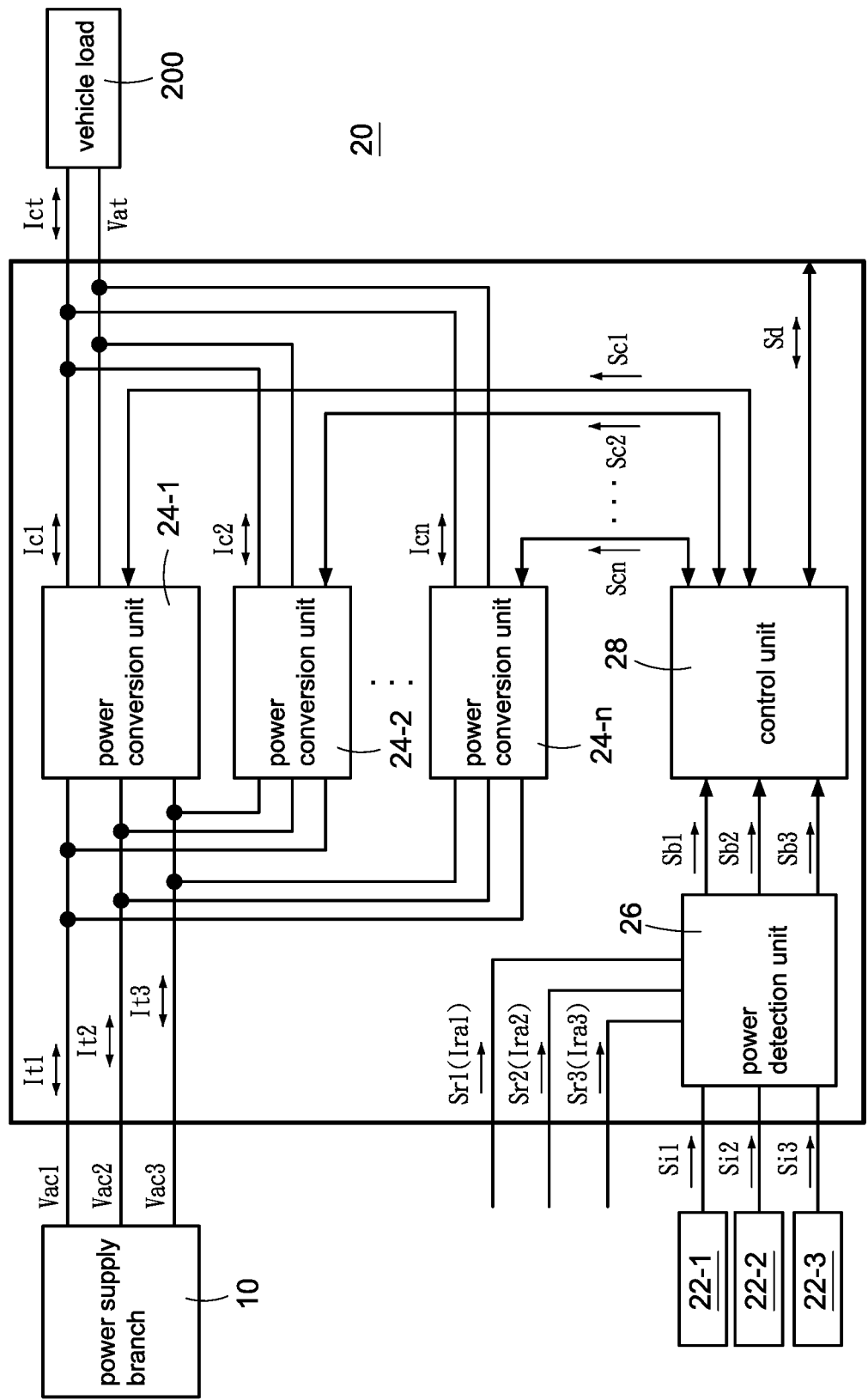
FIG. 2A is a circuit block diagram of the intelligent current control apparatus according to a first embodiment of the present disclosure.

Please refer to FIG. 2A, which shows a circuit block diagram of the intelligent current control apparatus according to a first embodiment of the present disclosure, and also refer to FIG. 1. The intelligent current control apparatus 20 includes a plurality of power conversion units 24-1~24-n, a power detection unit 26, and a control unit 28. Each of the power conversion units 24-1~24-n is a power conversion unit with a three-phase input for converting single-phase voltages Vac1~Vac3 into a total charging voltage Vat, or converting the total charging voltage Vat into the single-phase voltages Vac1~Vac3. Each of the power conversion units 24-1~24-n receives the plurality of single-phase currents It1~It3 to correspondingly provide a charging-discharging current Ic1~Icn according to the single-phase currents It1~It3 and current commands Sc1~Scn of the control unit 28. Alternatively, each of the power conversion units 24-1~24-n correspondingly receives the charging-discharging current Ic1~Icn to provide the single-phase currents It1~It3 according to the charging-discharging current Ic1~Icn. The sum of the charging-discharging currents Ic1~Icn is the total charging-discharging current Ict, and a relationship between the single-phase currents It1~It3 and the charging-discharging currents Ic1~Icn can be converted by a simple relation between the input power and the output power. Each of the power conversion units 24-1~24-n provides the corresponding charging-discharging current Ic1~Icn to charge the vehicle load 200. Alternatively, the vehicle load 200 provides the charging-discharging currents Ic1~Icn to each of the corresponding power conversion units 24-1~24-n so that the power conversion units 24-1~24-n provide the single-phase currents It1~It3 to the power supply branch 10 according to the charging-discharging currents Ic1~Icn.

Specifically, since each of the power conversion units 24-1~24-n is a bi-directional AC-to-DC converter, the single-phase currents It1~It3 may be different from the charging-discharging currents Ic1~Icn or the total charging-discharging current Ict. However, the input power of the each of the power conversion units 24-1~24-n is substantially equal to the output power thereof without considering conversion losses. Therefore, the input power of the power conversion unit 24-1, which equals the single-phase voltage Vac1 multiplied by the single-phase current It1, is equal to the output power of the power conversion unit 24-1, which equals the total charging voltage Vat multiplied by the charging-discharging currents Ic1, and the power conversion units 24-2~24-n are similar. Therefore, the total input power (corresponding to the single-phase currents It1~It3) of the intelligent current control apparatus 20 is equal to the total output power (corresponding to the total charging-discharging current Ict) of the intelligent current control apparatus 20, and vice versa.

The power detection unit 26 is coupled to the first current detection units 22-1~22-3 and the control unit 28, and receives the household current signals Si1~Si3 and the rated current signals Sr1~Sr3. The power detection unit 26 realizes the household phase currents Ih1~Ih3 of the household loads 14-1~14-3 according to the household current signals Si1~Si3, and realizes the rated phase currents Ira1~Ira3 according to the rated current signals Sr1~Sr3. Further, the power detection unit 26 realizes the available maximum value of each single-phase current It1~It3 according to the household current signals Si1~Si3 and the rated current signals Sr1~Sr3, and provides the available phase current signals Sb1~Sb3 representing (corresponding) to the available maximum values of the single-phase currents It1~It3 to the control unit 28. As shown in FIG. 2A, the power detection unit 26 is arranged inside the intelligent current control apparatus 20. Besides, the power detection unit 26 may be arranged outside the intelligent current control apparatus 20, and provides the available phase current signals Sb1~Sb3 to the control unit 28 of the intelligent current control apparatus 20.

The control unit 28 is coupled to the power detection unit 26 and each of the power conversion units 24-1~24-n. According to the available phase current signals Sb1~Sb3 and a handshaking signal Sd, the control unit 28 provide the current commands Sc1~Scn to control the power conversion units 24-1~24-n so that the total charging-discharging current Ict is limited by the available maximum value of each of the single-phase currents It1~It3. The control unit 28 realizes that the vehicle load 200 is in the charging mode or the discharging mode according to the handshaking signal Sd, and further calculates an extreme value of the total charging-discharging current Ict by the available phase current signals Sb1~Sb3 based on the charging mode or the discharging mode of the vehicle load 200.

More specifically, when the vehicle load 200 is not coupled to the intelligent current control apparatus 20, the available maximum values of the single-phase currents It1~It3 are known. When the vehicle load 200 is coupled to the intelligent current control apparatus 20, the control unit 28 is communicated with the vehicle load 200 by the handshaking signal Sd, i.e., a handshaking communication is performed. At this condition, the control unit 28 first sends messages to the vehicle load 200 by the handshaking signal Sd to inform an available total charging-discharging power to the vehicle load 200. In particular, the total charging-discharging power may involve the voltage values, the current values, and/or the limitation of the power values. The required power or the available power of the vehicle load 200 must be less than or equal to the available total charging-discharging power of the intelligent current control apparatus 20. The available total charging-discharging power is equal to a sum of the available maximum power of the single-phase currents It1~It3 based on the substantially equality between input power and the output power. Afterward, the control unit 28 receives the handshaking signal Sd provided from the vehicle load 200 to realize that the vehicle load 200 is in the charging mode or the discharging mode, and further the required power in the charging mode and the available power in the discharging mode.

In the charging mode of the vehicle load 200, the control unit 28 first informs the available total charging-discharging power to the vehicle load 200 through the handshaking signal Sd. Afterward, the control unit 28 realizes that the required power of the vehicle load 200 through the handshaking signal Sd. In particular, the required power must be less than the available maximum charging-discharging capacity of the intelligent current control apparatus 20. Finally, the control unit 28 controls the power conversion units 24-1~24-n to provide the required power to the vehicle load 200. Since the discharging operation of the vehicle load 200 to the intelligent current control apparatus 20 is contrary to the charging operation of the intelligent current control apparatus 20 to the vehicle load 200, the detail description of the discharging operation is omitted here for conciseness.

Since the number of the power conversion units 24-1~24-n is plural, different control manners can be performed. The first one of the control manners is that the control unit 28 controls the power conversion units 24-1~24-n to equally convert the charging-discharging currents Ic1~Icn. That is, although the available single-phase currents It1~It3 may be different, the charging-discharging currents Ic1~Icn provided from the power conversion units 24-1~24-n are identical. Based on the input power of the each of the power conversion units 24-1~24-n is substantially equal to the output power thereof without considering conversion losses, even if the input currents of the power conversion units 24-1~24-n and the output currents thereof are different. Therefore, for convenience of explanation, the viewpoint of the same power is taken as an illustration. It is assumed that the number of the power conversion units 24-1~24-3 is three, and the available powers of the three phases are 30 watts, 60 watts, and 90 watts (180 watts in total), respectively. After the communication between the control unit 28 and the vehicle load 200, the vehicle load 200 requires 180-watt power to be charged. The control unit 28 controls the power conversion units 24-1~24-n to equally provide 60-watt charging power to the vehicle load 200. The control unit 28 controls the first phase at the AC terminal of the three power conversion units 24-1~24-3 to receive 10-watt power (i.e., 30 watts/3=10 watts), controls the second phase thereof to receive 20-watt power (i.e., 60 watts/3=20 watts), and controls the third phase thereof to receive 30-watt power (i.e., 90 watts/3=30 watts). Therefore, each of the power conversion units 24-1~24-3 receives and provides 60-watt power to the vehicle load 200. At this condition, the power conversion units 24-1~24-3 equally provide the charging power to the vehicle load 200, and therefore the charging-discharging currents Ic1~Ic3 outputted from the power conversion units 24-1~24-3 are identical. Since the discharging operation of the vehicle load 200 to the intelligent current control apparatus 20 is contrary to the charging operation of the intelligent current control apparatus 20 to the vehicle load 200, the detail description of the discharging operation is omitted here for conciseness.

The second one of the control manners is that the control unit 28 controls at least one of the power conversion units 24-1~24-n to convert the charging-discharging currents Ic1~Icn. That is, not all power conversion units 24-1~24-n to be controlled. In the above example, only one or two of the power conversion units 24-1~24-n is controlled. Take the operation of two power conversion units as an example. The vehicle load 200 requires 180-watt power (total charging power) to be charged, and therefore the control unit 28 controls the first power conversion unit 24-1 to provide 120-watt charging power and controls the second power conversion unit 24-2 to provide 60-watt charging power. Since the available power of the first phase is 30 watts, the control unit 28 controls the first phases of the two power conversion units 24-1~24-2 to receive 20 watts and 10 watts, respectively. Similarly, since the available power of the second phase is 60 watts, the control unit 28 controls the second phases of the two power conversion units 24-1~24-2 to receive 40 watts and 20 watts, respectively. Similarly, since the available power of the second phase is 90 watts, the control unit 28 controls the third phases of the two power conversion units 24-1~24-2 to receive 60 watts and 30 watts, respectively. Therefore, the first power conversion unit 24-1 receives and provides 120-watt charging power to the vehicle load 200, and the second power conversion unit 24-2 receives and provides 60-watt charging power to the vehicle load 200. Therefore, the charging-discharging current Ic1 outputted from the first power conversion unit 24-1 is double of the charging-discharging current Ic2 outputted from the second power conversion unit 24-2, and the charging-discharging current Ic3 outputted from the third power conversion unit 24-3 is zero. Since the discharging operation of the vehicle load 200 to the intelligent current control apparatus 20 is contrary to the charging operation of the intelligent current control apparatus 20 to the vehicle load 200, the detail description of the discharging operation is omitted here for conciseness.

Figure 2B:
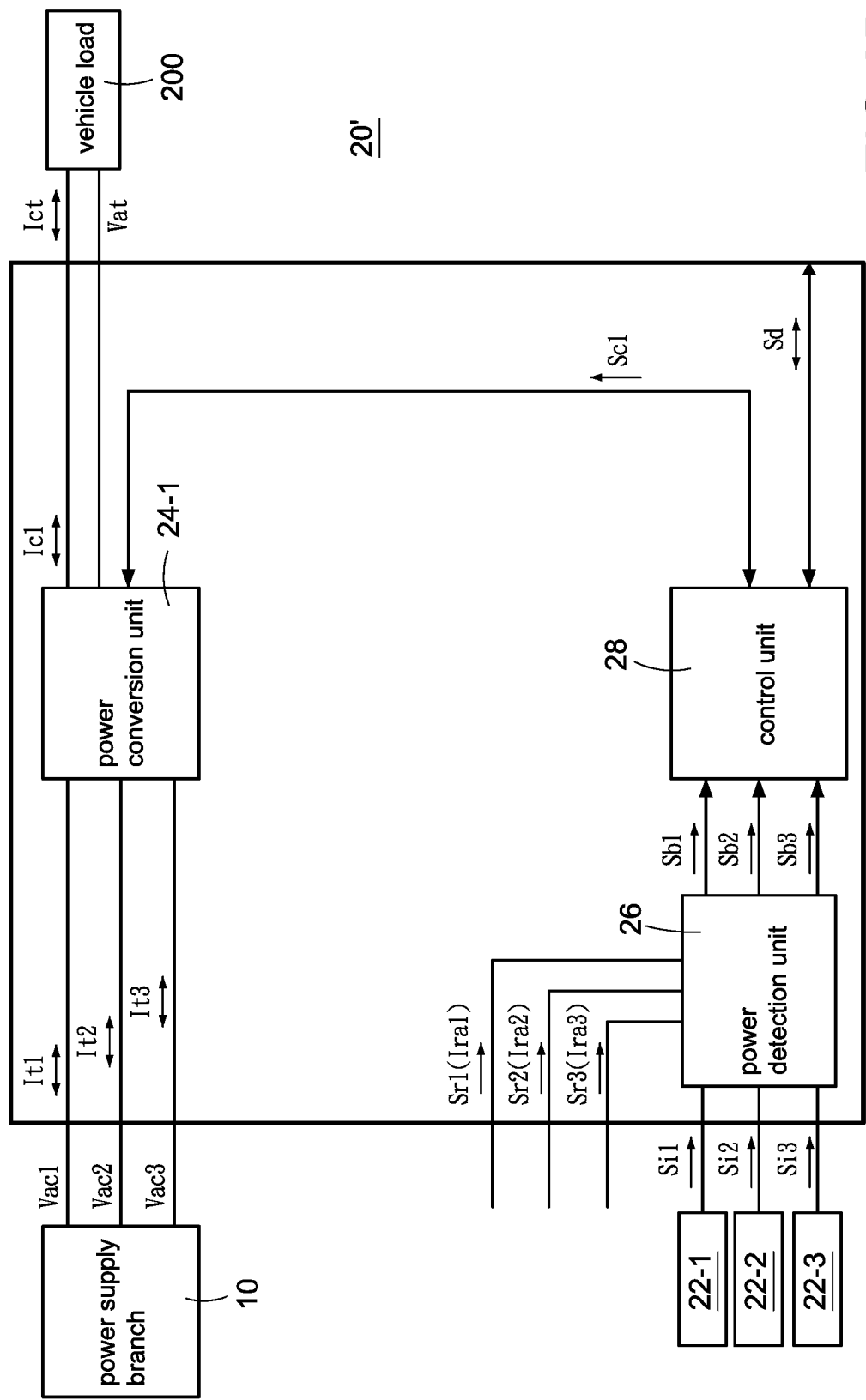
FIG. 2B is a circuit block diagram of the intelligent current control apparatus according to a second embodiment of the present disclosure.

Please refer to FIG. 2B, which shows a circuit block diagram of the intelligent current control apparatus according to a second embodiment of the present disclosure, and also refer to FIG. 1 to FIG. 2A. The major difference between the FIG. 2B and the FIG. 2A is that the intelligent current control apparatus 20' of the former includes only one power conversion unit 24-1. The power conversion unit 24-1 receives the plurality of single-phase currents It1~It3 and provides the charging-discharging current Ic1 according to the single-phase currents It1~It3. Alternatively, the power conversion unit 24-1 receives the charging-discharging current Ic1 and provides the plurality of single-phase currents It1~It3 according to the charging-discharging current Ic1. In particular, the charging-discharging current Ic1 is equal to the total charging-discharging current Ict. Similarly, the control unit 28 provide the current command Sc1 to control the power conversion unit 24-1 according to the requirement of the vehicle load 200 so that the total charging-discharging current Ict is limited by the available total value of the plurality of single-phase currents It1~It3. Since the number of the power conversion unit 24-1 is singular, the maximum total charging-discharging power that the vehicle load 200 can receive is equal to the maximum power that the power conversion unit 24-1 can provide, and vice versa. In particular, the components and operations that are not described in this embodiment are similar to those of FIG. 2A and will not be described again.

Figure 3A:
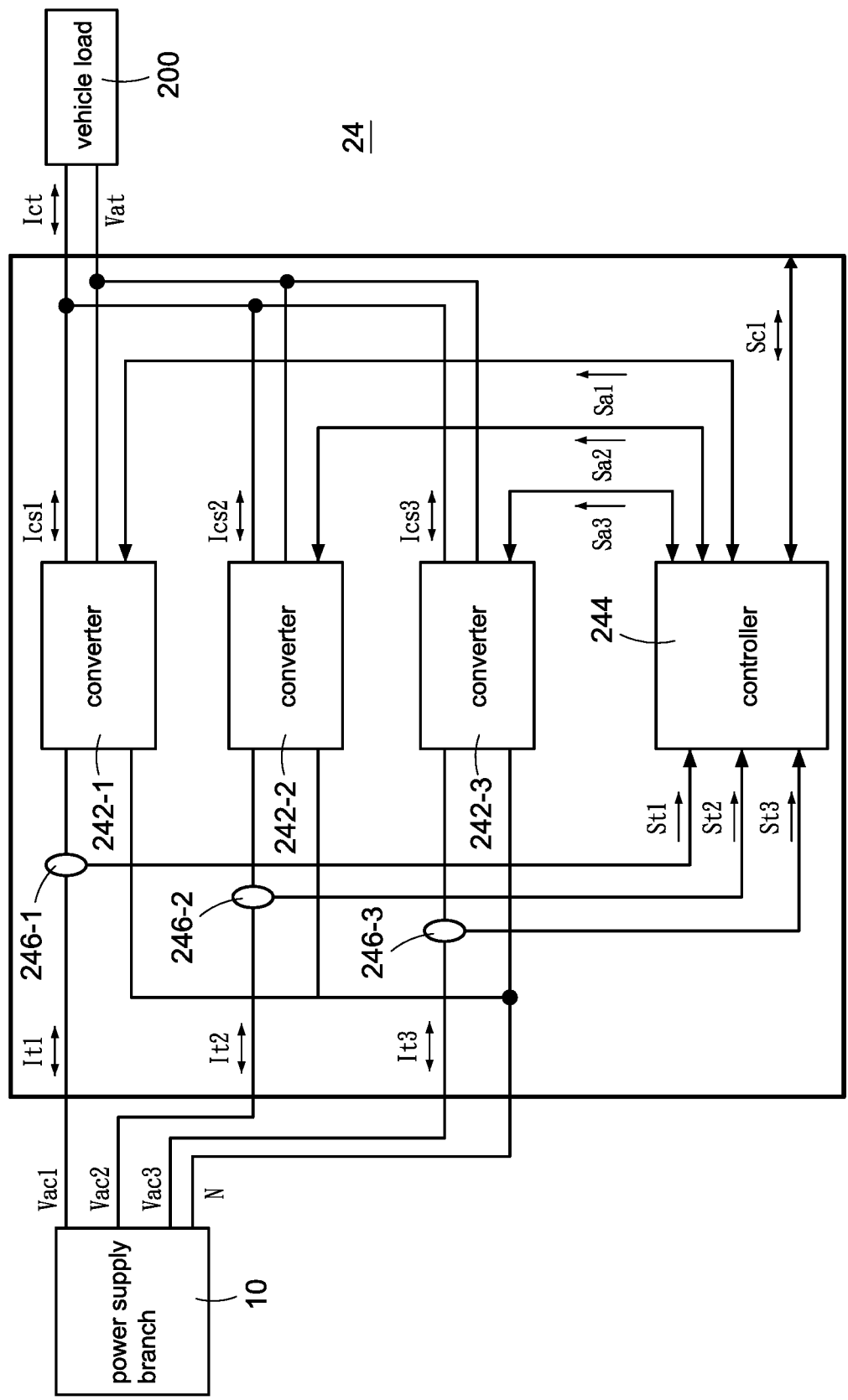
FIG. 3A is a circuit block diagram of the power conversion unit according to a first embodiment of the present disclosure.

Please refer to FIG. 3A, which shows a circuit block diagram of the power conversion unit according to a first embodiment of the present disclosure, and also refer to FIG. 1 to FIG. 2B. The power conversion unit 24 includes three converters 242-1~242-3, a controller 244, and three second current detection units 246-1~246-3. The converters 242-1~242-3 are coupled to the power supply branch 10 and the vehicle load 200 for voltage conversions between the single-phase voltages Vac1~Vac3 and the total charging voltage Vat. Based on the power calculation, the converters 242-1~242-3 correspondingly receive the single-phase currents It1~It3. Further, according to the single-phase charging-discharging currents Ics1~Ics3 provided by the single-phase currents It1~It3, the sum of the single-phase charging-discharging currents Ics1~Ics3 is equal to the charging-discharging current Ic1~Icn of the operated power conversion unit or the total charging-discharging current Ict. In particular, the above-mentioned operations are reversed if the vehicle load 200 is in the discharging operation.

The controller 244 is coupled to three converters 242-1~242-3 and the control unit 28. According to the requirement of charging power in the handshaking signal Sd sent from the vehicle load 200, the control unit 28 calculates and provides the current commands Sc1~Scn to the controller 244 of each power conversion unit 24. Therefore, the single controller 244 provides current control signals Sa1~Sa3 to the converters 242-1~242-3 according to the single current commands Sc1~Scn so as to control the converters 242-1~242-3 to correspondingly receive the single-phase currents It1~It3 and provide the single-phase charging-discharging currents Ics1~Ics3, or correspondingly receive the single-phase charging-discharging currents Ics1~Ics3 and provide the single-phase currents It1~It3. The three second current detection units 246-1~246-3 are coupled to the controller 244 to correspondingly detect the single-phase current signals St1~St3 corresponding to the single-phase currents It1~It3, and provide the single-phase current signals St1~St3 to the controller 244 so that the controller 244 controls the converters 242-1~242-3 to correspondingly adjust the single-phase currents It1~It3 according to the single-phase current signals St1~St3.

Take charging the vehicle load 200 without considering conversion losses for example. When the controller 244 realizes that the power conversion unit 24 controlled by the controller 244 needs to provide 60-watt charging power through the single current command Sc1~Scn, and the available single-phase powers are 30 watts, 30 watts, and 20 watts, respectively, the controller 244 sets the three converters 242-1~242-3 to correspondingly provide 30-watt, 20-watt, and 10-watt charging powers. Therefore, the three converters 242-1~242-3 correspondingly receive 30-watt, 20-watt, and 10-watt charging powers and provide the same charging power. If the 30-watt, 20-watt, and 10-watt charging powers are corresponding to the 3-ampere single-phase current It1, 2-ampere single-phase current It2, and 1-ampere single-phase current It3, the controller 244 controls the converters 242-1~242-3 to correspondingly adjust the single-phase currents It1~It3 to meet 3 amperes, 2 amperes, and 1 ampere. In particular, the above-mentioned operations are reversed if the vehicle load 200 is in the discharging operation.

Figure 3B:
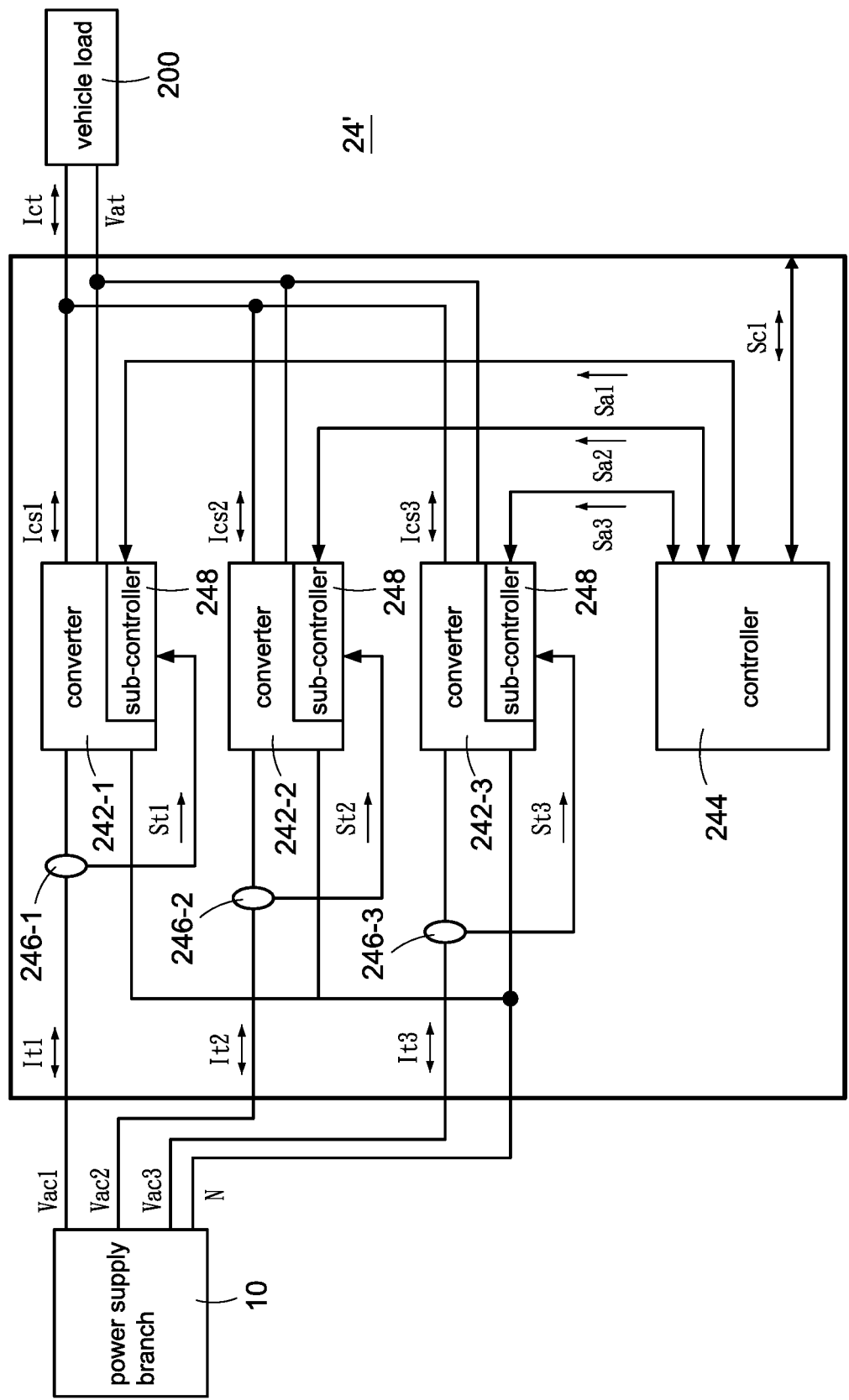
FIG. 3B is a circuit block diagram of the power conversion unit according to a second embodiment of the present disclosure.

Please refer to FIG. 3B, which shows a circuit block diagram of the power conversion unit according to a second embodiment of the present disclosure, and also refer to FIG. 1 to FIG. 3A. The major difference between the FIG. 3B and the FIG. 3A is that the second current detection units 246-1~246-3 of the power conversion unit 24' are correspondingly coupled to sub-controllers 248 inside the converters 242-1~242-3 so that the converters 242-1~242-3 controlled by the controller 244 realize and adjust the single-phase currents It1~It3 according to the single-phase current signals St1~St3. In particular, the components and operations that are not described in this embodiment are similar to those of FIG. 3A and will not be described again.

Figure 4:
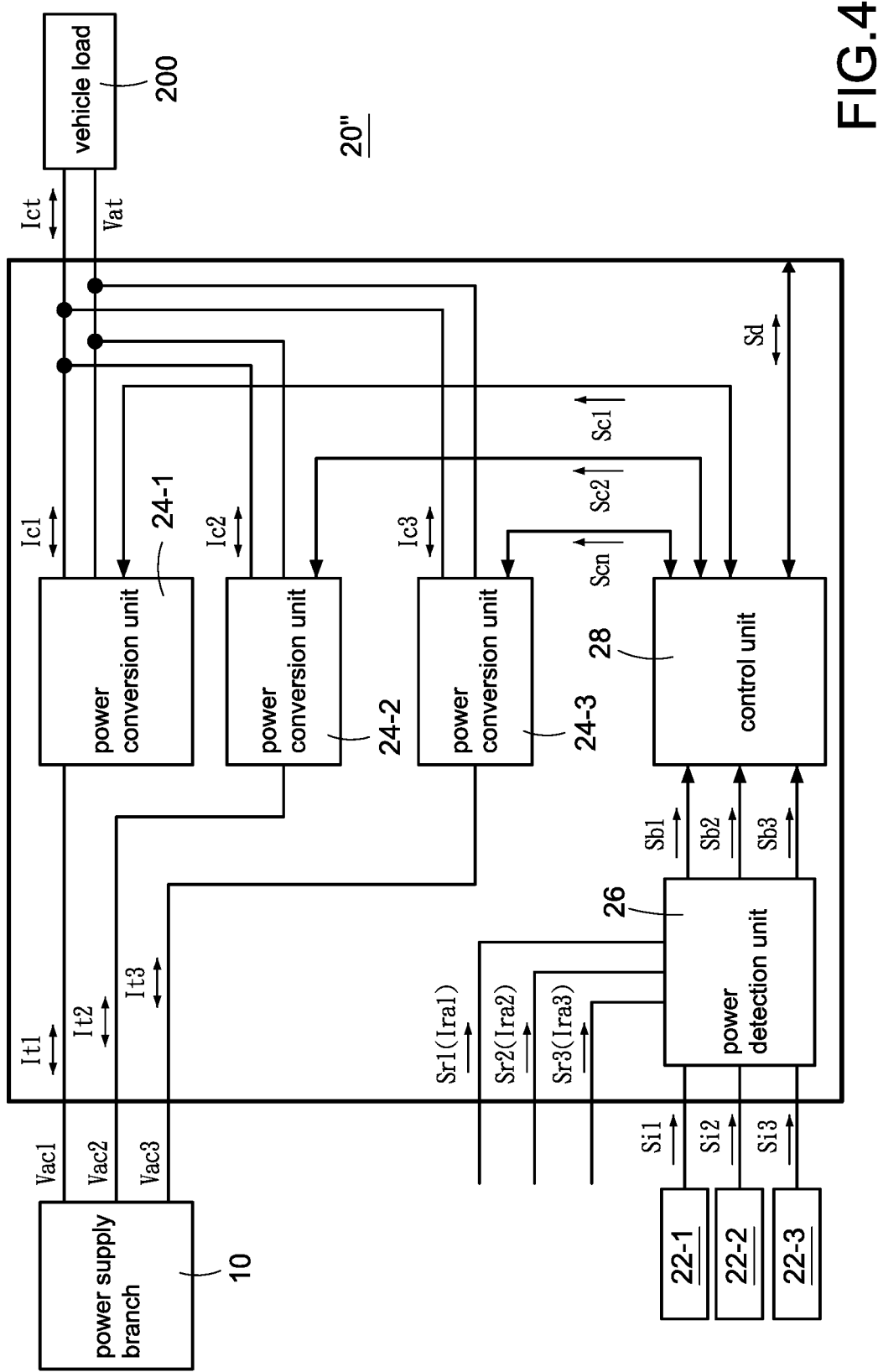
FIG. 4 is a circuit block diagram of the intelligent current control apparatus according to a third embodiment of the present disclosure.

Please refer to FIG. 4, which shows a circuit block diagram of the intelligent current control apparatus according to a third embodiment of the present disclosure, and also refer to FIG. 1 to FIG. 3B. The major difference between the FIG. 4 and the FIG. 2A is that the intelligent current control apparatus 20″ of the former includes three power conversion units 24-1~24-3, and each of the power conversion units 24-1~24-3 is a power conversion unit with a single-phase input. The power conversion units 24-1~24-3 correspondingly convert the single-phase voltages Vac1~Vac3 into the total charging voltage Vat, or correspondingly convert the total charging voltage Vat into the single-phase voltages Vac1~Vac3. The power conversion units 24-1~24-3 correspondingly receive the single-phase currents It1~It3 and provide the charging-discharging currents Ic1~Ic3 according to the single-phase currents It1~It3 and the single current commands Sc1~Scn provided by the control unit 28. Alternatively, the power conversion units 24-1~24-3 correspondingly receive the charging-discharging currents Ic1~Ic3 and provide the single-phase currents It1~It3 according to the charging-discharging currents Ic1~Ic3. In particular, the components and operations that are not described in this embodiment are similar to those of FIG. 2A and will not be described again. In particular, the circuit blocks inside the power conversion units 24-1~24-3 are similar to those of the FIG. 3A and FIG. 3B, and the major difference is that only one converter 242-1 and one second current detection unit 246-1 in each of the power conversion units 24-1~24-3. In particular, the components and operations that are not described in this embodiment are similar to those of FIG. 3A and FIG. 3B and will not be described again.

Please refer to FIG. 5A, which shows a schematic waveform of a charging control of the intelligent current control apparatus according to the present disclosure, and also refer to FIG. 1 to FIG. 4. Under the charging mode of the vehicle load 200 and the relationship of Ih1+It1=Ia1<Ira1, the rated phase currents Ira1~Ira3 are fixed values. Further, the sum of each household phase current Ih1~Ih3 and the each single-phase current It1~It3 does not exceed each rated phase current Ira1~Ira3. Therefore, if each household phase current Ih1~Ih3 is increased, the corresponding single-phase current It1~It3 is limited to downward adjusted, thereby avoiding the used power in any one phase exceeding the rated power.

Please refer to FIG. 5B, which shows a schematic waveform of a discharging control of the intelligent current control apparatus according to the present disclosure, and also refer to FIG. 1 to FIG. 5A. Since the vehicle load 200 can provide power by discharging to the power company through the intelligent current control apparatus 20, and the power company provides the household phase currents Ih1~Ih3 to the household loads 14-1~14-3, the direction of currents flowing to the power company is opposite to those of the single-phase currents It1~It3 and the household phase currents Ih1~Ih3. By subtracting the consumed household phase currents Ih1~Ih3 of the household loads 14-1~14-3, the available current is the single-phase currents It1~It3 that can be provided to the power company from the vehicle load 200. Under the discharging mode of the vehicle load 200 and the relationship of It1-Ih1=Ia1<Ira1, the rated phase currents Ira1~Ira3 are fixed values. Further, each single-phase current It1~It3 minus each household phase current Ih1~Ih3 does not exceed each rated phase current Ira1~Ira3. Therefore, if each household phase current Ih1~Ih3 is increased, the corresponding single-phase current It1~It3 is limited to upward adjusted as long as the used power in any one phase not exceeding the rated power. If the current direction of supplying power from the power company is positive, the single-phase currents It1~It3 provided from the vehicle load 200 are equal to the reversed currents of the rated phase currents Ira1~Ira3 minus the household phase currents Ih1~Ih3.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An intelligent current control apparatus providing a current control for a power supply branch and a load, wherein a plurality of independent total phase currents are transmitted through the power supply branch, the intelligent current control apparatus comprising:
    at least one power conversion unit configured to deliver a total charging-discharging power to charge or discharge the load according to a plurality of independent single-phase currents transmitted by the power supply branch, wherein at least one of the independent single-phase currents is different to another one of the independent single-phase currents, and wherein the current of each phase of the plurality of independent total phase currents is composed of the independent single-phase currents of the same phase and a household phase current of the same phase, and
    a control unit coupled to the at least one power conversion unit configured to independently control the plurality of independent single-phase currents such that the current of each phase of the plurality of independent-a total phase currents is less than or equal to a rated phase current of the same phase of the power supply branch.

2. The intelligent current control apparatus in claim 1, wherein when the load is charged by the intelligent current control apparatus, the current of each phase of the plurality of independent total phase currents is equal to the independent single-phase currents of the same phase plus the household phase current of the same phase.

3. The intelligent current control apparatus in claim 1, wherein the load is discharged to the intelligent current control apparatus, the current of each phase of the plurality of independent total phase currents is equal to the independent single-phase currents of the same phase minus the household phase current of the same phase.

4. The intelligent current control apparatus in claim 1, further comprising:
    a power detection unit coupled to the power supply branch and the control unit,
    wherein the power detection unit is configured to detect a household current signal corresponding to the household phase current of each phase, and provide an available phase current signal of each phase to the control unit according to the rated phase current of each phase and the household current signal so that the control unit is configured to realize a limitation of the total charging-discharging power according to the available phase current signal of each phase.

5. The intelligent current control apparatus in claim 4, wherein each of the at least one power conversion unit comprises:
at least one converter coupled to the power supply branch and the load,
a controller coupled to the at least one converter and the control unit, and
at least one current detection unit configured to detect at least one single-phase current signal corresponding to the independent single-phase currents,
wherein the control unit is configured to provide a current command to the controller according to the available phase current signal of each phase so that the controller is configured to provide at least one current control signal to the at least one converter according to the current command to control the at least one converter receiving the independent single-phase currents to provide a single-phase charging-discharging current or receiving the single-phase charging-discharging current to provide the independent single-phase currents, and control the at least one converter adjusting the independent single-phase currents according the at least one single-phase current signal.

6. The intelligent current control apparatus in claim 5, wherein the at least one current detection unit is coupled to the controller, and the controller is configured to receive the at least one single-phase current signal to realize the independent single-phase currents and control the at least one converter adjusting the independent single-phase currents.

7. The intelligent current control apparatus in claim 5, wherein the at least one current detection unit is coupled to the at least one converter, and the at least one converter is configured to realize the independent single-phase currents and adjust the independent single-phase currents according the at least one single-phase current signal.

8. The intelligent current control apparatus in claim 5, wherein when the at least one power conversion unit is a power conversion unit with a three-phase input, the number of the at least one converter is three and the number of the at least one current detection unit is three; when the at least one power conversion unit is a power conversion unit with a single-phase input, the number of the at least one converter is one and the number of the at least one current detection unit is one.

9. The intelligent current control apparatus in claim 4, wherein the control unit is communicated with the load by a handshaking signal; the control unit is configured to realize a demand power of the load and control the at least one power conversion unit providing the demand power to the load, wherein the demand power is less than or equal to the limitation of the total charging-discharging power.

10. The intelligent current control apparatus in claim 9, wherein the control unit is configured to realize the demand power provided from the load and control the at least one power conversion unit converting the demand power to the power supply branch, wherein the demand power is less than or equal to the limitation of the total charging-discharging power.

11. The intelligent current control apparatus in claim 1, wherein the number of the at least one power conversion unit is plural, each power conversion unit is configured to provide or receive a charging-discharging current, and a sum of the charging-discharging currents is a total charging-discharging current corresponding to the total charging-discharging power.

12. The intelligent current control apparatus in claim 11, wherein each power conversion unit is a power conversion unit with a three-phase input; each power conversion unit is configured to receive all of the independent single-phase currents to provide the charging-discharging current according to all of the independent single-phase currents, or each power conversion unit is configured to receive the charging-discharging current to provide all of the independent single-phase currents according to the charging-discharging current.

13. The intelligent current control apparatus in claim 12, wherein the control unit is configured to control the power conversion units averagely converting the charging-discharging currents, or control at least one of the power conversion units converting the charging-discharging current.

14. The intelligent current control apparatus in claim 11, wherein each power conversion unit is a power conversion unit with a single-phase input; each power conversion unit is configured to receive one of the independent single-phase currents to provide the charging-discharging current according to one of the independent single-phase currents, or each power conversion unit is configured to receive the charging-discharging current to provide one of the independent single-phase currents according to the charging-discharging current.

15. The intelligent current control apparatus in claim 1, wherein the number of the at least one power conversion unit is singular, each power conversion unit is configured to receive all of the independent single-phase currents to provide a total charging-discharging current corresponding to the total charging-discharging power according to all of the independent single-phase currents, or each power conversion unit is configured to receive the total charging-discharging current to provide all of the independent single-phase currents according to the total charging-discharging current.

* * * * *